US005117919A

United States Patent [19]

Borries et al.

[11] Patent Number: 5,117,919

[45] Date of Patent: Jun. 2, 1992

[54] TORQUE CONTROL SYSTEM AND METHOD

[75] Inventors: John A. Borries; Dennis A. Jarc, both of Chardon, Ohio

[73] Assignee: The Rotor Tool Company, Cleveland, Ohio

[21] Appl. No.: 406,151

[22] Filed: Sep. 11, 1989

[51] Int. Cl.[5] .......................... G01L 5/24; B23Q 15/12

[52] U.S. Cl. .......................................... 173/1; 173/177; 73/862.23

[58] Field of Search .......................... 173/11, 12, 170; 81/467, 469, 470; 73/862.22, 862.23, 862.24

[56] References Cited

U.S. PATENT DOCUMENTS

| | | | |
|---|---|---|---|
| 3,082,742 | 3/1963 | Vilmerding et al. . | |
| 3,572,447 | 3/1971 | Pauley et al. . | |
| 3,983,947 | 10/1976 | Wills . | |
| 4,006,784 | 2/1977 | Dudek . | |
| 4,023,406 | 5/1977 | Benz . | |
| 4,027,530 | 6/1977 | Tambini . | |
| 4,081,037 | 3/1978 | Jonsson | 173/12 |
| 4,199,032 | 4/1980 | Weiner et al. | 173/12 |
| 4,305,471 | 12/1981 | Eshghy . | |
| 4,418,765 | 12/1983 | Mori et al. | 173/12 |
| 4,427,007 | 1/1984 | Hall . | |
| 4,492,146 | 1/1985 | Workman . | |
| 4,535,850 | 8/1985 | Alexander . | |
| 4,576,270 | 3/1986 | Baltz . | |
| 4,708,210 | 11/1987 | Rahm . | |
| 4,721,166 | 1/1988 | Clapp . | |
| 4,730,254 | 3/1988 | Voden, Jr. | 173/12 |
| 4,805,404 | 2/1989 | Dupin . | |
| 4,844,176 | 7/1989 | Podsosinski . | |
| 4,887,499 | 12/1989 | Kipfelsberger | 173/12 |
| 4,894,767 | 1/1990 | Doniwa | 173/12 |
| 4,903,783 | 2/1990 | Rushanan et al. | 173/12 |

FOREIGN PATENT DOCUMENTS 6548234 12/1937 Fed. Rep. of Germany .

OTHER PUBLICATIONS

"2- and 3-way solenoid pilot and remote air pilot in line" Mac Valves, Inc. May, 1986.

*Primary Examiner*—Douglas D. Watts
*Assistant Examiner*—Scott A. Smith
*Attorney, Agent, or Firm*—Calfee, Halter & Griswold

[57] ABSTRACT

An air tool torque control system includes a controller operative to independently control two air tools with continuous programmed adjustment of the torque shut off point for each tool after each fastener joint is made. The torque specification is measured for each fastener joint made, is verified as being within an acceptable torque range, is compared to the set point of that torque specification range to determine the variation therebetween, and is then adjusted toward the mid point by the applicable correction factor for the variation determined to continuously compensate for variations in joint rate, line pressure and/or tool output. To enhance the effectiveness of the system, fast acting solenoid valves utilizing line pressure to assist in valve closure may be included to improve shut off control. Torque select devices may also be included at the assembly station to allow selective switching of each tool to preprogrammed discrete torque ranges for specific fastener applications performed at that station.

6 Claims, 8 Drawing Sheets

TORQUE CONTROL SYSTEM AND METHOD

FIELD OF THE INVENTION

The present invention relates to a torque control system for controlling the torque applied by air tools, and specifically relates to an air tool torque control system and method for continuously adjusting the torque shut off point of an air tool to keep fasteners within specifications and having a fast acting shut-off valve assembly utilizing system air pressure to assist in valve closure upon feedback command.

BACKGROUND OF THE INVENTION

Air tools are commonly used to apply torque during make up of fastener joints. Nutrunner air tools, for example, are used to provide relative rotation between a nut and bolt by running the nut along the bolt to form a fastener joint connection. The torque applied is substantially increased under load as the fastener connection approaches completion. In order to apply a specified torque, torque shut off valves have been used in air tools to shut off the air supply to the tool motor when a desired torque specification is achieved.

To ensure that the fastener joints assembled fall within an acceptable torque specification range, regulators have been used to control the air tool pressure. Regulators operate to reduce tool air pressure, and thus operate the tool more slowly. Operation at the slower rate enables the air tool to be shut off with less risk of overshooting or missing the desired torque specification.

The critical nature of certain fastener joints additionally requires verification that the torque specification of each joint is within an acceptable range of torque specifications. Verification, or monitoring, systems are used to set a desired torque specification, and to measure the torque applied to the assembled joints to ensure they fall within the accepted range. Verification is necessary in critical fastener joints due to the numerous factors which can potentially vary the conditions of fastener joint assembly, and thus the torque specification of the fastener joint connection. Factors contributing to such variations include joint characteristics, fluctuation in air supply pressures, damage to the tool itself, the differing characteristics of fasteners, and the shut off control over the air tool valves.

One problem with existing regulators and monitoring systems is that they do not provide automatic adjustment or control over the air tool to correct future fastener joint assembly, if the measured torque specification is found to be unacceptable.

SUMMARY OF THE INVENTION

The present invention provides a torque control system for monitoring the torque specification of assembled fastener joints, and continuously adjusting the torque shut off point of an air tool based upon the measured torque applied to the preceding fastener connection and upon the acceptable torque specification range for the fastener connections being made.

The torque control system includes a preprogrammed controller for assembling fastener connections to a desired torque specification range, and an air tool interconnected therewith which operates to assemble the fastener connections in accordance with the desired specifications. The control system further includes a torque select device for independently controlling at least two independent air tools, and providing each air tool with as many as four different position settings for assembling fastener connections at four different torque specification ranges.

The controller is preprogrammed to include the respective data for each desired torque specification, including, for example, the range of acceptable torque specifications at each desired setting, and the high and low torque limits. Once the torque specification data is programmed in the controller, the desired torque specification is selected for the fastener to be assembled using the torque select device. The controller then provides air tool operating instructions to shut off each tool independently during fastener joint assembly once the selected torque specification is obtained. The controller provided uses tool sensors, such as transducers or the like, to continuously compare and adjust tool shut off points to keep the fastener joint output torque consistent with the desired torque specification. The shut off point is continuously adjusted based upon torque measurements taken of the previously assembled fastener joint. Such adjustment is required, since assembly conditions of the fastener joints may vary due to joint conditions, line pressure or tool output. The controller's ability to adjust each tool's shut off point in order to obtain the desired fastener joint torque specification is further improved by providing the tools with fast acting shut-off valve assemblies.

The adjustment of torque setting is continuously made by comparing the torque measured to the set point of the acceptable torque range. For example, if the acceptable torque range is from 90–100 ft/lbs and the desired torque specification (set point) is 95 ft/lbs, the measured torque applied, for example 99 ft/lbs, is compared to 95 ft/lbs and a correction factor applied to the difference.

The air tools of the present invention are provided with improved fast acting shut off valve assemblies housed within the tool. Assisted by line pressure, the improved shut-off valves rapidly shut off air supply to the tool once the fastener joint is assembled to the desired torque specification or to a joint torque within the acceptable torque specification range.

Two different exemplary fast acting shut off valves are disclosed in this application. In the first, a spool valve is used in conjunction with a solenoid valve. By changing the state of the solenoid valve, the spool valve shifts under line pressure to close the port leading to the air motor. In the second, the solenoid changes state allowing the valve be driven to its closed position, with closure being assisted by a venturi effect created by the system air.

These features, as well as additional features and advantages of the present invention, will be better understood setting forth in detail certain embodiments of the invention which are only a few of the various embodiments of the principles of the invention.

DETAILED DESCRIPTION OF THE PREFERRED EMBODIMENT

Figure 1A:
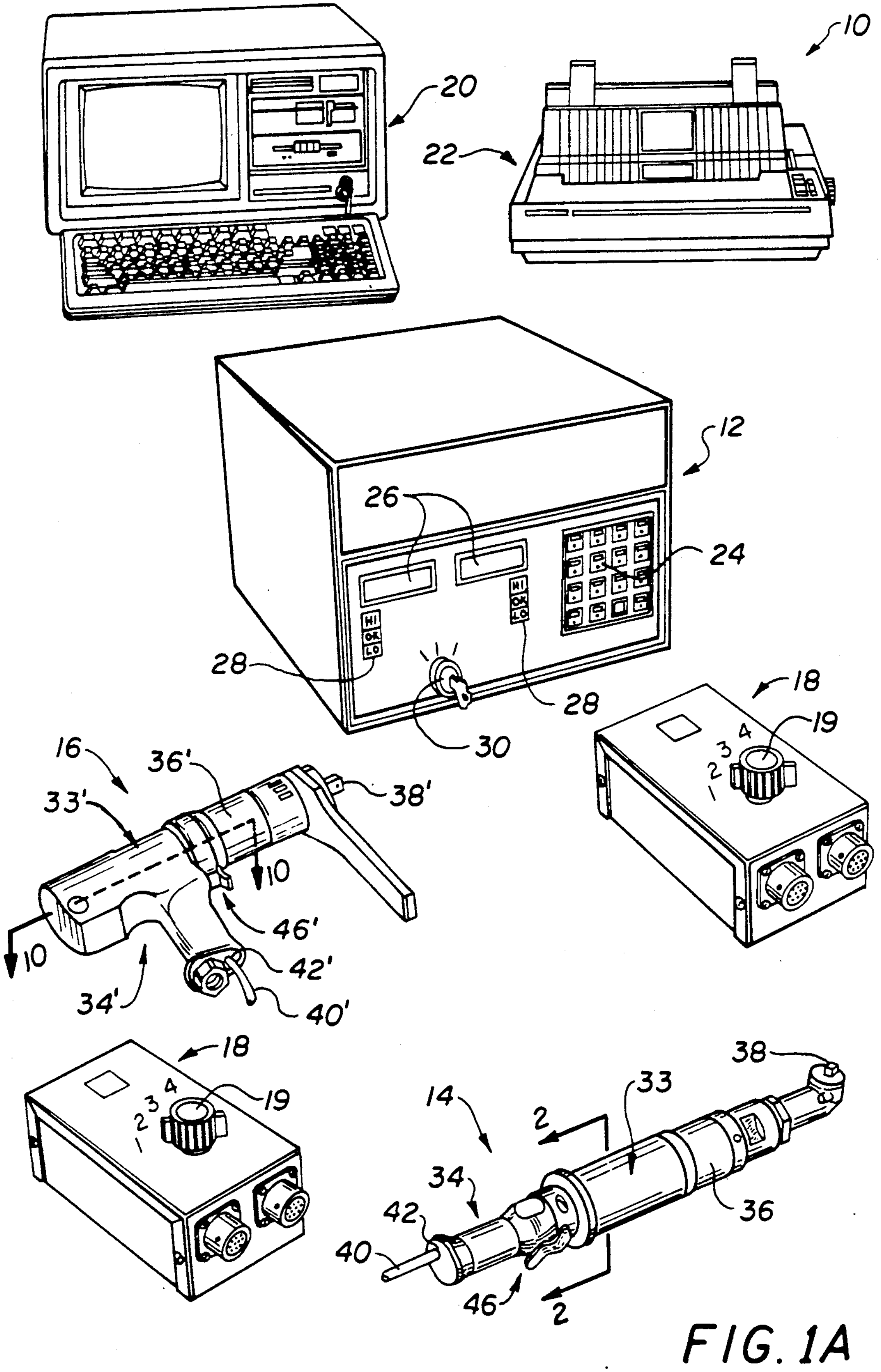
FIG. 1A is a schematic elevational view of components of the torque control and measurement system of the present invention.

A torque control system 10 in accordance with the present invention is illustrated in FIG. 1A of the drawings. The torque control system includes a microprocessor controller 12 and air tools 14, 16. Although a right angle nutrunner 14 and pistol grip nutrunner 16 are illustrated, it will be appreciated that the invention contemplates utilizing and controlling any type of air tool and using all one type of tool in the system or mixing the tools for optimizing the efficiency of tool operation for the application involved. The control system additionally includes, as optional components, torque select devices 18, a personal computer 20 and a printer 22.

The controller 12, as illustrated, is a two-channel programmable microprocessor for monitoring and adjusting the shut off points of the system air tools 14, 16, based upon the torque specifications for the fastener joints assembled using the tools. Although a two channel controller 12 is illustrated, it will be appreciated that the present invention contemplates a single channel controller as well as a multiple channel controller having more than two channels. The controller is programmed to accept various input torque specification data for each channel, including the desired or target torque specification, high and low torque values for the acceptable torque specification range, a qualifier or torque threshold value, a tool calibration value, a torque correction factor, a cycle delay time and a statistical population quantity of the torque specifications for the fastener joints assembled.

The controller 12 includes the following conventional components: a sealed membrane keypad 24, two four-digit LED's 26 for displaying data with respect to each channel, and torque status lights 28 for indicating whether the torque output of each fastener joint assembled is over the high torque specification ("Hi"), below the low torque specification ("Lo"), or between the high and low torque specification, and thus "OK". Additionally, the controller includes a conventional keylock system switch 30 for selecting controller operating positions and preventing unauthorized use or tampering with the controller, and a battery powered back-up system (not illustrated) to insure that the controller data remains in memory during a loss of system power.

Each channel of the controller 12 is capable of providing four desired torque specifications, so that each air tool 14, 16 can be used to assemble four different fastener joints, each having a different desired torque specification. The desired torque specifications are selected using the remote torque select devices 18 which can be located in an operator's work area. The torque select devices include a movable dial 19 to manually select the preprogrammed desired torque specification. Alternatively, a socket tray containing differently shaped selector bodies is used in conjunction with a set of sockets on the torque select devices. By placing the chosen selector body in the corresponding socket on the torque control device, the preprogrammed corresponding torque specification is selected for use during assembly of the fastener joint. The torque select devices allow an assembly line worker to do four different fastener applications at the same station to enhance flexibility and worker stimulation.

During operation of the torque control system, the controller is first programmed using the keypad 24 to encode the desired specifications and data for each torque select channel. In the preferred embodiment, the controller has a memory capability sufficient to receive 1,500 data points when only a single torque select is in use, or no multi-torque select devices are in use as shown schematically in FIG. 1C. When the control system includes multi-torque select devices 18, as shown schematically in FIG. 1B, the memory capability of the controller is reduced to 500 data points per channel, although additional capacity could be built into or added to the system if desired. It will be appreciated that keypad 24 can be used to reprogram the controller 12 to input new torque specifications for different fastener or air tool applications.

Figure 1B:
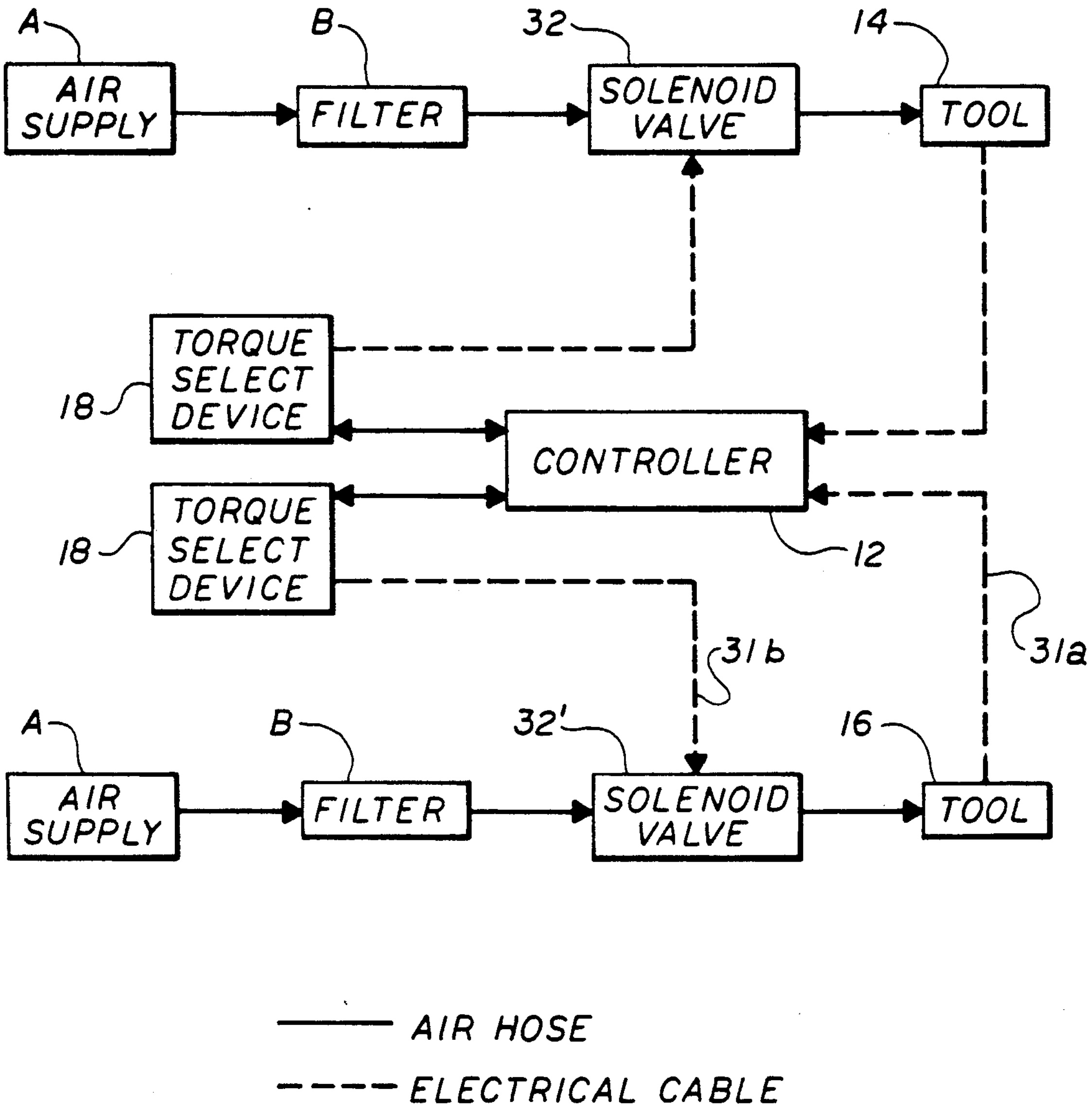
FIG. 1B is a flow chart schematically illustrating the air flow and electrical feedback interconnections between components of one embodiment of the present invention, wherein the illustrated system includes optional torque select devices associated with each tool.

Once the desired input torque specification data has been entered into the controller, the control system 10 is ready to accept feedback data during assembly of the fastener connections. As shown in FIG. 1B, the controller 12 is electrically interconnected between each torque select device 18 and associated air tool 14, 16. Being positioned at this location, the controller is capable of controlling the shut off point of each air tool based upon the torque specification output provided from each tool. Conventional torque sensors (not shown) provide fastener torque feedback information through feedback control lines 31A to the controller during fastener assembly to the desired torque specification, as determined from the sensor readings. Just prior to the selected torque level being obtained, the controller communicates a shut-off signal through control line 31B to the solenoid valve assembly 32 of the tool.

Upon receiving a shut off operating signal, the solenoid valve assembly 32 turns off the tool by blocking the flow of pressurized system air to the air motor. As illustrated in FIG. 1B, each tool and its associated solenoid valve assembly 32 is controlled by the controller 12. The control system 10 illustrated in FIG. 1C, similarly illustrates the electrical control of each tool 14, 16 and its associated solenoid valve assembly 32 using the controller 12. In the embodiment of the control system illustrated in FIG. 1C, however, only one desired torque specification range per channel is available until the controller 12 is reprogrammed.

The controller 12 is additionally provided with learn, calibrate, run and reset positions for providing flexibility of the control system. As set forth above, the controller may be specifically programmed to include desired torque specifications, as well as various other torque data information per channel. In the learn position, the controller assembles fastener joints using the desired torque specification or target torque, and automatically adjusts the shut off point of the air tool based upon the results of previously assembled fastener joints. The controller also performs the learn function in both run and calibrate positions. The difference being, that in the calibrate position, the learn function is performed without entering the data characteristics of each joint assembled into controller memory.

The calibrate position may thus be used on actual or simulated joint connections until the proper air tool shut off point is "learned". Once the desired torque is obtained, the key switch is moved to the run position. In the run position the controller continues to shut-off the air tool at the desired torque specification, however, the data characteristics of each joint assembled are saved in controller memory for analysis. It is noted that in the run position, the controller will not compensate for, or consider measurements of, assembled joint connections which exceed the maximum correction factor. By eliminating these excessive torque measurements, unnecessary automatic adjustments or corrections are not made due to double hits or slipping off during assembly, or other operator difficulties. The learn program is also structured to learn only when the tool shuts off, also minimizing "learning" from improper operations.

The learn function of the controller is initiated upon each entry of a new target torque into the controller, and/or movement to the reset position, and movement of the key switch to either the run or calibrate positions. The first fastener joint to be assembled in run or calibrate position will be to the low torque specification limit, or somewhat above that limit, depending on tool operating conditions. For each joint assembled after the first, however, the learn function is performed to adjust the air tool shut off point, and the resulting fastener joint torque specification. To perform the learn function the tool sensor determines the torque specification of the assembled joint and provides the joint measurement to the controller, thereby learning when the tool is to be shut off.

The percentage difference between the target torque and the actual torque measured is next determined. To calculate the percentage difference the actual torque is subtracted from the target torque, multiplied by 100, and the product is divided by the target torque. Once a calculation of the percentage difference is obtained, the controller proceeds to calculate the next shut off point of the air tool in order to obtain a fastener joint closer to the target torque.

The next air tool shut off point is calculated by subtracting the target torque from the actual torque measured (or vice versa), and dividing this difference by the correction or adjustment factor. The resulting number is added to (or subtracted from) the previous torque setting in order to get each succeeding fastener torqued closer to the desired or set point torque specification. The adjustment factor is preprogrammed into the controller, and changes by factors of two as a function of the percentage difference calculated between the actual and target torque specifications. For example, if the percentage difference is calculated as plus or minus 1.56%-3.125%, the adjustment factor would be 2. If the percentage difference is plus or minus 3.125% to 6.25%, the adjustment factor is 4. The percentage difference of torque specification is thus factored into the shut off point adjustment function.

The controller is thus used to assemble joint connections progressively closer to the target torque, since additional fastener joints assembled are to a torque specification progressively nearer the desired torque specification. The controller is generally capable of obtaining assembled fastener joints at the torque target after approximately six to eight assembly operations. The controller, however, continues to monitor changes in the fastener joint torque specifications, and automatically adjusts the air tool shut off point as needed.

The controller is additionally preprogrammed for calculating statistical characteristics and analyzing of the fastener joints assembled, in addition to the torque data displayed by the LED's 26 and torque status lights 28 on the controller 12. The data and statistics, which may be displayed depending on the optional components of the control system, include the percentage of fasteners assembled by the air tool within the torque specification, the percentage of fasteners assembled over the high torque specification limit, the percentage of fasteners assembled below the low torque specification limit, the mean torque, the highest torque recorded, the lowest torque recorded, the range between the highest and lowest torques recorded, the tool performance or six Sigma (15 foot-pounds), the capability ratio (six Sigma divided by the torque specification range) and the individual data points recorded in controller memory.

The optional interface components which may be incorporated into the control system include the printer 22, computer 20 and the combination of the computer and printer. Where these options are included, the controller is capable of displaying, outputting and/or downloading the data and statistics set forth above as requested.

Figure 1C:
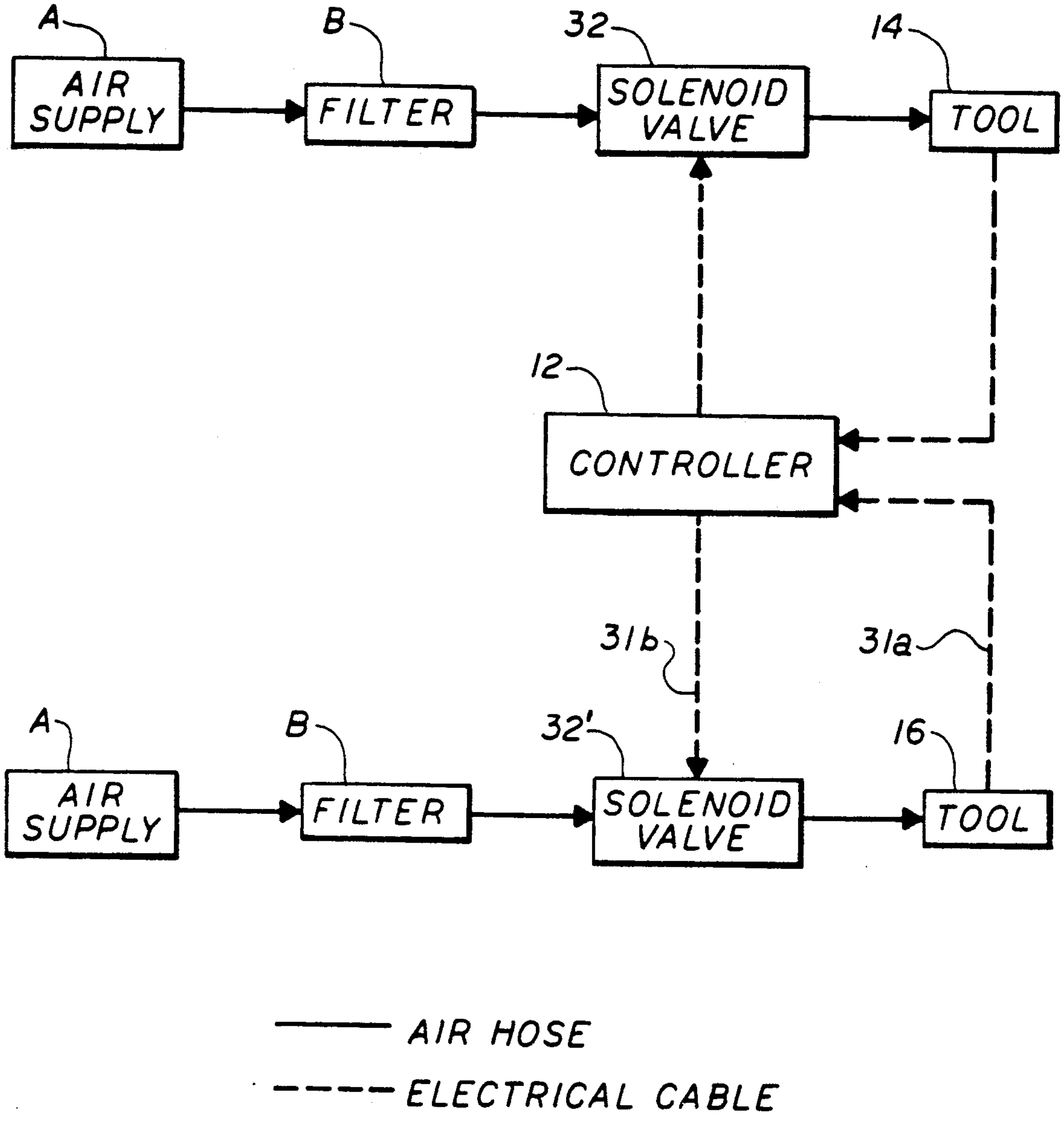
FIG. 1C is a flow chart schematically illustrating the interconnection between components of another embodiment of the present invention, without torque select devices.

Turning now to shut-off valves controlled by the system, the air tool components 14, 16 of the system 10 are illustrated generally in the preferred embodiment of the torque control system in FIG. 1A, and schematically in FIGS. 1B and 1C. In accordance with FIGS. 1A, and 2-9, a right angle nut runner embodiment 14 of an air tool is illustrated, and in FIGS. 1A and 10 a pistol grip air tool 16 is illustrated. Where the portions of the pistol grip air tool are the same as the right angle nutrunner, the same reference numerals will be used, but with a prime designation being used for the pistol grip air tool components.

Figure 3:
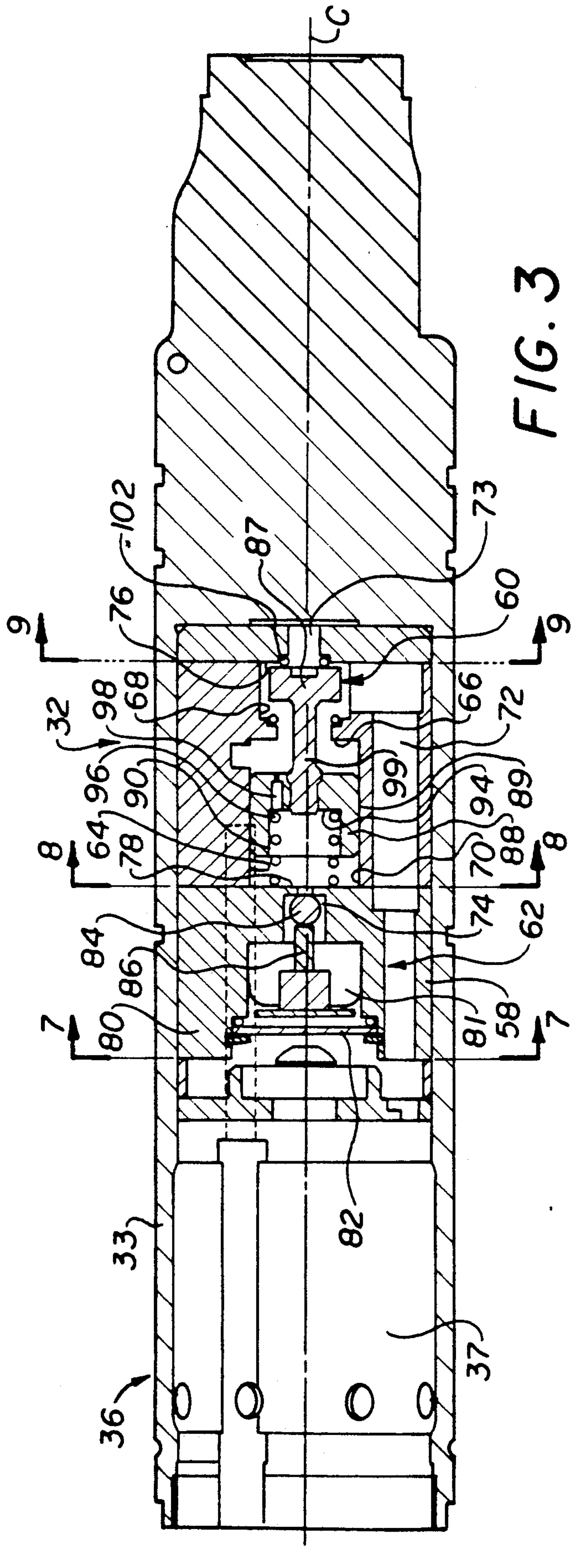
FIG. 3 is a cross section of the throttle, valve and motor sections of the right angle nutrunner tool component, taken generally along the plane 3—3 of FIG. 2 and showing the shut-off valve in an open position and the solenoid valve in a closed position.
Figure 10:
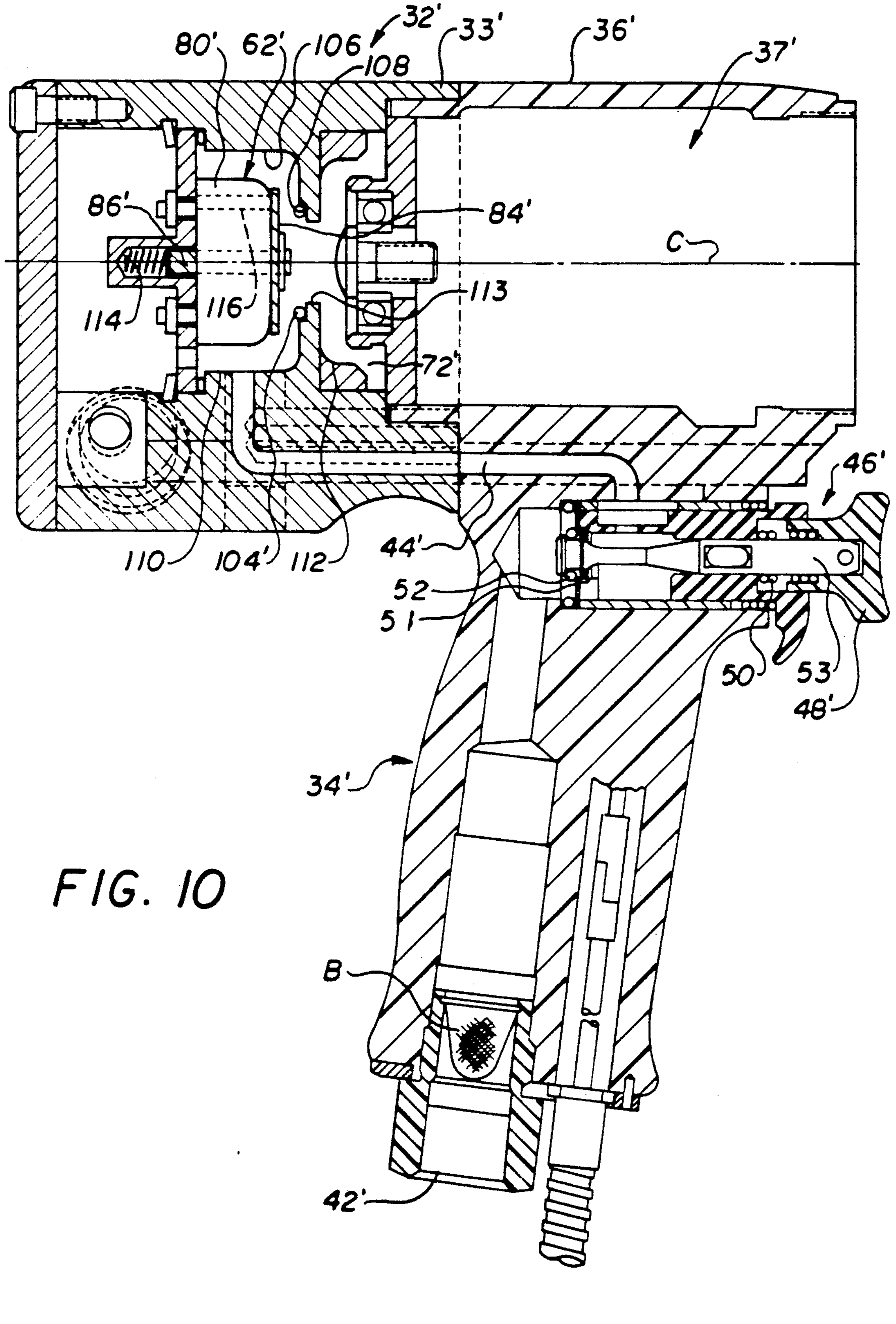
FIG. 10 is a cross section of the handle and solenoid valve sections of the pistol grip tool component of the present invention, taken generally along the line 10—10 of FIG. 1A, and showing the solenoid valve in an open position.

As shown in FIGS. 1A, 3 and 10, the air tools include a tool body 33 having a handle portion 34, an air motor portion housing 36, an air motor 37 and a rotary work output spindle 38. The work spindle 38 may have a variety of conventional work pieces attached thereto, such as a conventional socket, not shown. The socket is rotated to complete a threaded connection or fastener when the tool is actuated by an operator grasping the handle portion 34 and selectively actuating the tool.

Once the controller is programmed to include the desired torque specifications of the fasteners to be assembled, the tool may be activated. The desired torque specification is selected from the programmed values using the dial 19 or the socket selector. To activate the tools, compressed air, for example from the factory air supply system A passed through an optional filter B, is provided to the tools 14, 16 via supply hose 40, 40' at an air inlet 42, 42' near the rear of the handle portion 34, 34'. The compressed air at the air inlet 42, 42' may selectively pass into a main air supply line 44, 44' by manual activation of a conventional throttle valve, indicated generally at 46, 46'.

Figure 2:
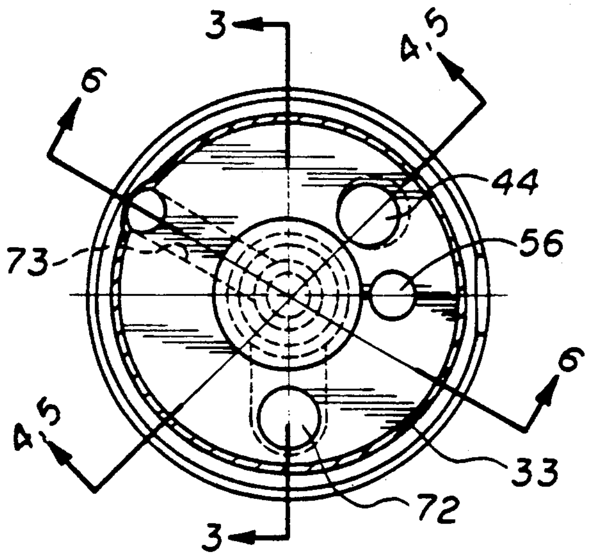
FIG. 2 is a cross sectional end view of a right angle nutrunner tool component of the present invention, taken generally along the plane 2—2 of FIG. 1A.
Figure 7:
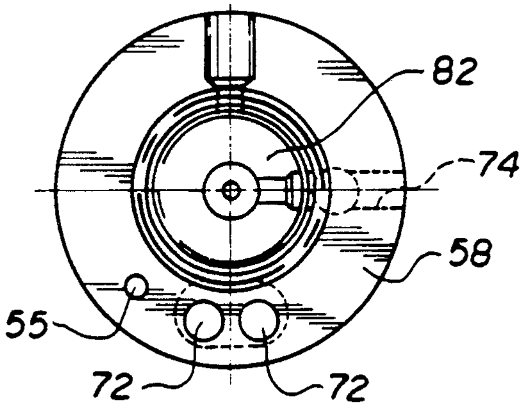
FIG. 7 is a cross sectional end view of a solenoid housing of the right angle nutrunner, taken generally along the plane 7—7 of FIG. 3.
Figure 8:
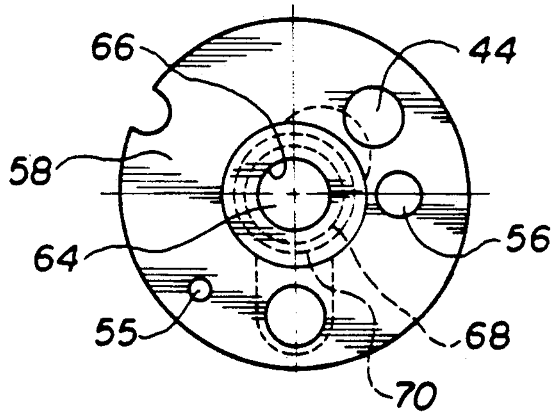
FIG. 8 is a cross sectional end view of a valve body of the right angle nutrunner, taken generally along the plane 8—8 of FIG. 3.
Figure 9:
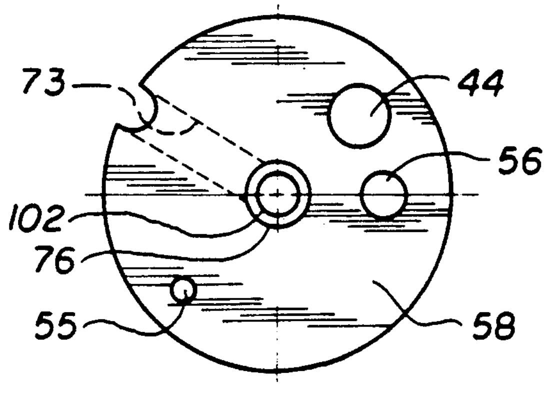
FIG. 9 is a cross sectional end view of an end cap of the right angle nutrunner, taken generally along the plane 9—9 of FIG. 3.
Figure 4:
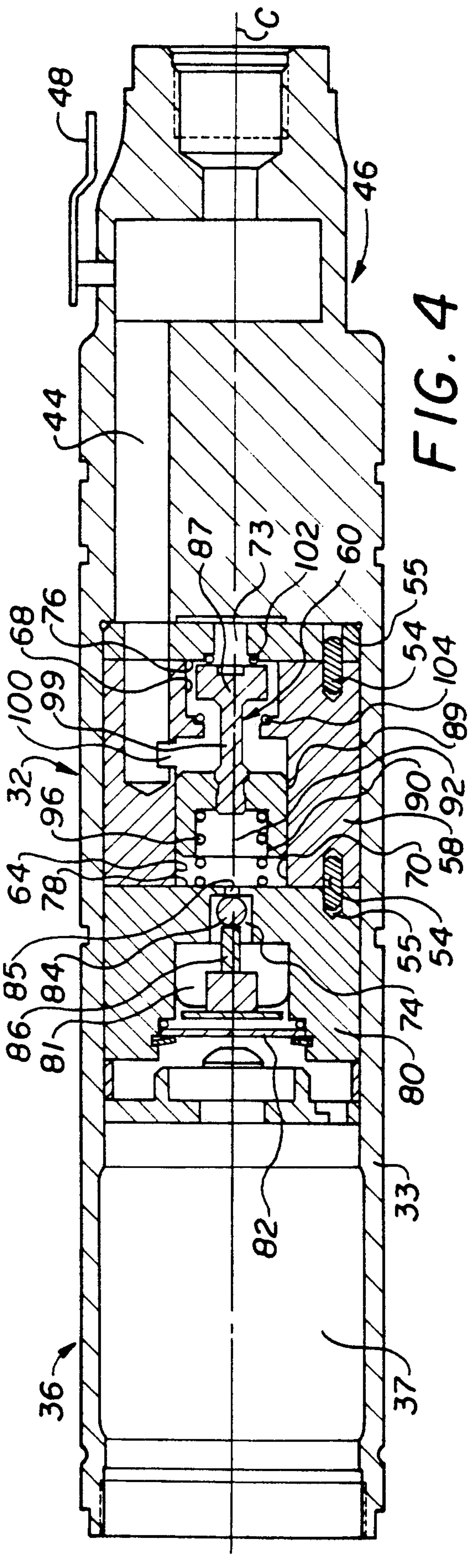
FIG. 4 is a cross section of the throttle, valve and motor sections of the right angle nutrunner similar to FIG. 3 but taken generally along the plane 4—4 of FIG. 2.
Figure 5:
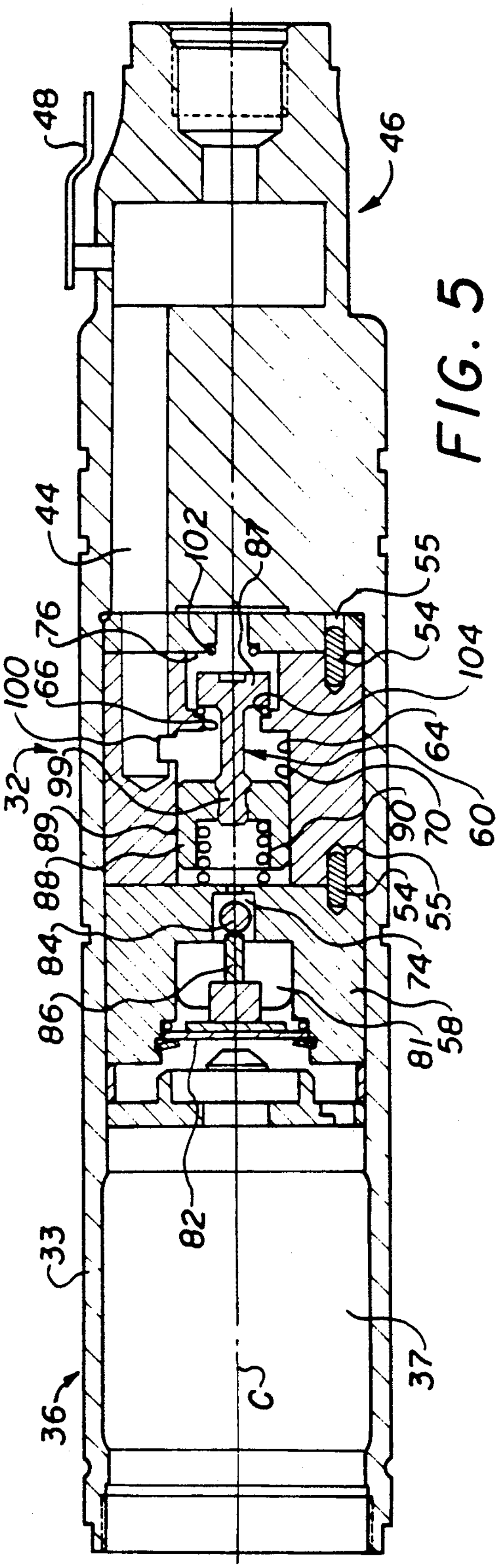
FIG. 5 is a cross section of the throttle, solenoid valve and motor sections of the right angle nutrunner, taken generally along the plane 5—5 of FIG. 2, and showing the solenoid valve in an open position and the shut-off valve in a closed position.

As the internal operation and components of throttle valves are well known in the art, only the external operating lever 48 of the valve is shown in the illustrations of the right angle tool 14 in FIGS. 2, 4 and 5.

A more detailed illustration of a conventional throttle valve is illustrated in the pistol grip tool embodiment 16 in FIG. 10. The throttle valve 46' illustrated in FIG. 10 is normally biased by a spring 50 to a position in which a seal 52 on plunger 53 is compressed against a valve seat 51 in a closed position, and compressed air travelling through the bore in the pistol grip is blocked from flowing into the main supply line 44'. The trigger 48 is mounted to the handle portion 34' for reciprocal sliding movement, with the trigger being mounted on the plunger 53. When the trigger is manually depressed, the plunger and trigger move against the spring bias to the left as viewed in FIG. 10 to unseat the seal 52 from valve seat 51 to allow pressurized air to flow into the main air supply line. When the trigger is released, the spring 50 biases the trigger to the right as viewed in FIG. 10 to reposition the seal on the valve seat to block air flow to the main air supply line 44'.

Operation of the air tools additionally includes use of fast acting solenoid valve assemblies. The solenoid valve assemblies are illustrated generally in FIGS. 2-9 and 10, at reference numerals 32 and 32', respectively, positioned internally of the air tools 14, 16. The valve assemblies may, however, be positioned externally of the tools as schematically illustrated in FIGS. 1B and 1C. During tool operation, line pressure air selectively flows through the main air supply line 44, 44' and enters the valve assembly 32, 32', positioned generally coaxial with a longitudinal axis of the the tool body 33.

With respect to the right angle nutrunner 14, the valve assembly 32 is positioned within the tool body 33 by pins 54 being received within locator holes 55. A passage for housing the electrical connection to the solenoid valve assembly is also provided within the tool body as illustrated at 56 in FIG. 8, and each of the inlets, exhausts and passages provided extend substantially parallel to one another and to the longitudinal axis C of the tool body. In the event of an electrical malfunction, the valve assembly operates, as set forth below, to shut off the tool.

The valve assembly 32 includes a generally cylindrical valve body 58, a spool type, shut-off valve member assembly 60, and a solenoid assembly 62. The valve body 58 includes a bore 64 therein and an annular shoulder 66 radially extending partially into the bore intermediate its ends to define a first bore portion 68 and a second bore portion 70. During operation of the air tool, the first and second bore portions 68, 70 are in fluid communication.

The valve assembly 32 additionally includes an air feed passage 72, and first and second exhaust passages 73, 74. The air feed passage 72 extends from the first bore portion 68 to the tool air motor 37. The first exhaust passage 73 extends from a blind end 76 of the first bore portion to atmosphere, and the second exhaust passage 74 extends from a blind end 78 of the second bore portion 70 to atmosphere. The second exhaust passage is axially spaced from and opposite to the first exhaust passage 73.

Figure 6:
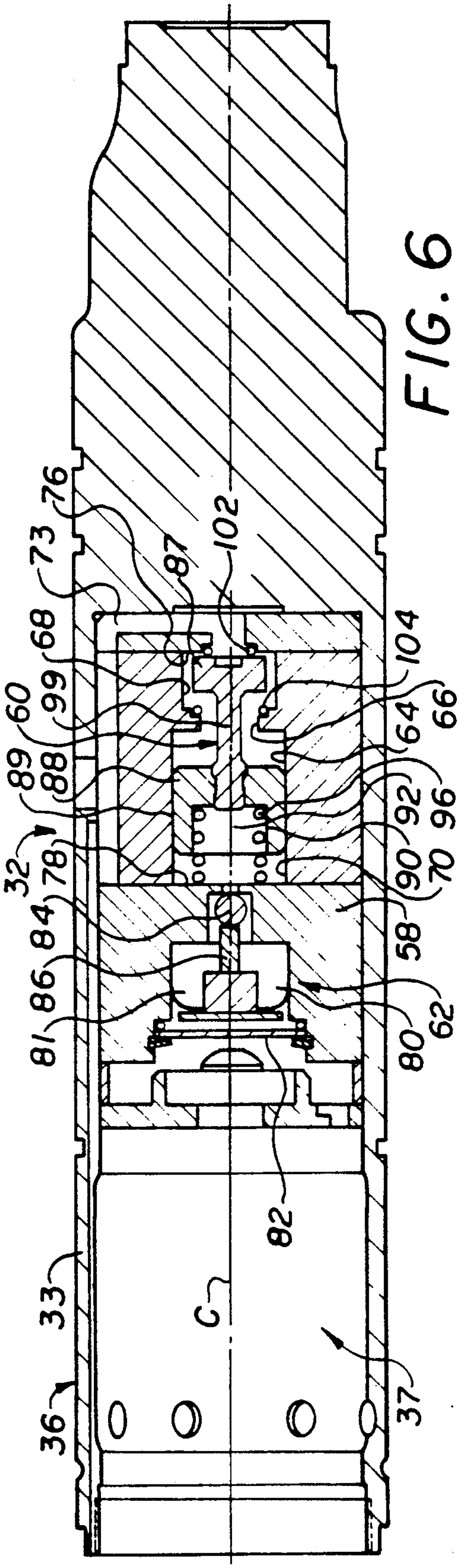
FIG. 6 is a cross section of the throttle, valve and motor sections, taken generally along the plane 6—6 of FIG. 2, and showing the solenoid valve in a closed position and the air shut-off valve reset to its open position to initiate the next cycle.

The solenoid assembly 62 is axially spaced from the second exhaust passage 74 and includes a housing 80, a solenoid 81 mounted in a bore in the housing, an end cap 82 to secure the solenoid and block air flow, a ball seal 84 for blocking engagement within the port 85 of the second exhaust passage 74, and a solenoid plunger 86. The solenoid 81 is energized during tool operation to urge the plunger and the ball seal to the right as viewed in FIG. 3 to a closed position against port 85, as illustrated in FIGS. 3, 4 and 6, thereby to block any air flow through the second exhaust passage 74.

The shut-off valve member assembly 60 is received within and reciprocates along the first bore portion 76 to alternately block and open the air feed passage and first exhaust passage. The valve member assembly 60 includes a cylindrical piston 88 having a greater diameter than its associated valve shut-off head 87. The piston 88 includes an external wall 89 to engage and reciprocate along the second bore portion 78. The piston 88 is cup shaped to form an internal piston wall 90 and an internal piston chamber 92 having an end wall 94 for seating of and guiding engagement with a piston reset spring 96. The piston reset spring 96 extends between the end wall 94 and the blind end 78 of the second bore portion 70 spaced therefrom. During tool operation, the piston spring 96 may assist in urging the piston 88 and shut-off head 87, as illustrated in FIGS. 3, 4, and 6, to a position wherein the shut-off head is engaged with the end 68 of the first bore portion to block the port and prevent air flow through the first exhaust passage 73. An air bleed passage 98 is also provided through the end wall 94 of piston 88 to introduce line pressure air to both sides of the piston. The shut off head 87 and piston 88 are interconnected by a stem 99, for simultaneously reciprocating the shut-off head and piston in a spool type valve. The shut off head reciprocates in the first bore portion 68, and the piston 88 is in reciprocal sliding engagement with the second bore portion 70.

Once the tool is activated, line pressure air is introduced via the main air supply line 44 to the valve body 58 at air inlet 100 to the second bore portion 70, between the annular shoulder 66 and the piston 88. The line pressure air in the second bore portion 70, together with the piston reset spring 96, urge the shut off head 87 contained within the first bore portion 68 into sealed engagement with a seal 102 surrounding the port for the first exhaust passage 73 on the blind end 76 of the first bore portion. Having full line air pressure against the surface area of the shut off head 87 and pressure equalization on both sides of the piston (as described below), the valve member is urged to the right as viewed in FIGS. 3, 4, and 6, to seal and prevent air flow through the first exhaust passage 73 and to open air feed passage 72.

During tool operation the air bleed passage 98 through the piston 88 permits compressed air from the right of the piston in the first and second bore portions 68 and 70 to pass to the left of the piston into the piston chamber 92 in the second bore portion and adjacent the end 78, which is closed by solenoid ball seal 84. The line pressure is thus equalized on both sides of the piston to allow the air pressure against head 87 to urge the head into sealed engagement with seal 102 at the end of the first bore portion, and prevent air flow through the first air exhaust passage 73. When the valve member is in sealed engagement with the end 76 of the first bore portion, the first exhaust passage 73 is closed, and line Pressure air thus flows through the air supply line 44, second bore portion, first bore portion 68 and air feed passage 72, respectively, to the air motor 37.

To deactivate the tool, a shut off signal is received from the controller 12 which deenergizes the solenoid, resulting in operation of the valve assembly 60 to cut off line pressure air to the air motor. The shut off condition is communicated by the controller as the fastener approaches the desired shut-off point. Upon deenergizing the solenoid 81, the plunger 86 normally urging the ball seal 84 to a position blocking the flow of air to the second exhaust passage 74, is retracted to the position shown in FIG. 5. Upon retraction of the plunger 86, the ball seal 84 is unseated, and line pressure air within the piston chamber 92 flows through the second air exhaust passage 74 to atmosphere. By exhausting air from the piston chamber through second exhaust passage 74, pressure equalization no longer exists on opposite sides of piston 88.

Assisted by line pressure air from the air supply line 44 acting on the piston 88, which has greater surface area than the shut-off head 87, the piston 88 is urged left toward the end 78 of the second bore portion 70, thereby simultaneously reciprocating the shut-off head 87 left into sealing engagement with a seal 104 surrounding the annular shoulder 66 within the first bore portion 68. Such sealing engagement closes the air feed passage 72, stops the air motor 37, and opens the first air exhaust passage 73 to vent any line pressure air captured in the first bore portion 68 and air feed passage 72. Use of the preferred embodiment of the solenoid valve assembly 32 stops rotation of the tool work portion 38 within approximately 6–8 milliseconds. Additionally, venting line pressure air from the tool via air exhaust passages 73, 74 with some line pressure assistance, reduces the potential for air pressure spikes during tool start up.

The controller 12 is additionally provided with a solenoid reset switch which activates within 1–5 seconds from solenoid shut off. Despite resetting of the solenoid, however, the plunger 86 cannot be moved to reseat the ball seal 84 covering the second exhaust passage 74 until the throttle valve is manually released. While the trigger 48 continues to be depressed, line pressure air passing through port 98 in piston 88 continues to urge the ball seal off the seat. Once the throttle valve 46 is released, the plunger 86 reseats the ball seal, and the piston reset spring 96 urges the piston 88 and shut-off head connected thereto to the right toward the first bore portion 68. When the shut-off head 87 engages seat 102 to block first exhaust passage 73, the tool has been automatically reset to start the next fastener cycle. Thus, line pressure air prevents the solenoid ball seal from reseating, and potentially inadvertantly activating the tool when the operator continues to depress the throttle valve trigger after the solenoid is reset.

In addition, if the power fails, the solenoid 81 will be deactuated and its plunger 86 will retract to open second exhaust passage 74. This will result in the spool valve assembly 60 moving to the left to close the air supply passage 72 leading to the air motor. Therefore, the solenoid and shut-off valve assemblies of the present invention fail in a safe mode discontinuing tool operation.

With respect to the pistol grip tool embodiment 16, the solenoid valve assembly 32′ includes a solenoid 62′, a bore 106 in the tool body 33′ and an annular shoulder 108 radially extending partially into the bore intermediate its ends to define a first bore portion 110, second bore portion 112 and an opening 113 therebetween. During operation of the air tool 16, the first and second bore portions 110, 112 are in fluid communication. The valve assembly additionally includes an air feed passage 72′, and an air exhaust passage 116. The air feed passage 72′ extends from the second bore portion 112 to the tool air motor 37′. The air exhaust passage 116 extends through the solenoid housing to atmosphere.

The solenoid assembly 62′ is positioned within the first bore portion 110 and includes a solenoid housing 80′, an end cap 82′, and a plunger 86′. During tool operation, the solenoid 81′ is energized to retract the plunger against a closure spring 114 normally biasing the plunger toward a position preventing air flow to the air motor. In this retracted position, the shut off head 89′ is positioned against the solenoid housing 80′ to block exhaust passage 116 and to allow system air to flow through the opening 113 in shoulder 108. The tool operating position is illustrated in FIG. 10, wherein air flow from the main air supply line 44′ is permitted to flow through supply passage 44′ to the first bore portion 110, past the annular shoulder 108, to the second bore portion 112, and then through the air feed passage 72′ to the air motor 37′ housed within the air motor portion 36′.

When the shut off signal is received from the controller 12 to deactivate the tool by deenergizing the solenoid, the valve assembly 32′ operates to cut off line air to the air motor. Upon being deengergized, the solenoid plunger 86′ advances to the right as viewed in FIG. 10 to its normally closed position under the bias of plunger spring 114. Assisted by a venturi effect of the line pressure air moving through the restricted opening 13 in shoulder 108 the plunger is moved to the right to bring shut-off head 89′ into sealing engagement with the seal 104′ in the first bore portion surrounding the opening in the annular shoulder 108. Such sealing engagement closes the air feed passage 72′ to stop the air motor 37′, and opens the air exhaust passage 116 to atmosphere, venting any line pressure air captured in the first bore portion and air feed passage. Use of this preferred embodiment of the valve assembly stops rotation of the tool work portion within approximately 10 milliseconds.

The solenoid reset switch in the pistol grip tool 16 operates as previously described with respect to the nut runner tool 14. In the pistol grip tool embodiment, the plunger cannot be unseated from sealing engagement with the shoulder until the throttle valve trigger 48′ is manually released. While the trigger continues to be depressed, line pressure air and the plunger spring 114 continue to urge the plunger into sealing engagement with the annular shoulder 66'. Once the throttle valve is released, the solenoid plunger is energized and overcomes the bias of the plunger spring 114 normally urging the plunger toward the annular shoulder and moves the shut-off member 89' to the operating position. Thus, the line pressure air prevents the plunger from unseating and potentially inadvertantly activating the tool when the operator continues to depress the trigger after the solenoid is reset. In addition, a power failure will result in the spring 114 and system air closing the shut-off head 89 to deactivate the tool in a fail safe mode.

It will be apparent from the foregoing that changes may be made in the details of construction and configuration without departing from the scope and spirit of the invention as defined in the following claims.

We claim:

1. A torque control system for controlling the torque specification of a fastener joint, said system comprising, an air tool having a solenoid valve assembly for assembling a fastener joint to a torque specification within a range of acceptable torque specifications, said solenoid valve assembly including a solenoid, a valve member and a throttle valve, which during operation of said air tool are energized, open and activated, respectively, to permit the flow of line pressure air for assembly of said fastener joint, and upon completion of assembly of said fastener joint, said solenoid and valve member are de-energized and closed, to prevent the flow of line pressure air operating said tool, means for measuring the torque specification applied to an assembled fastener joint, means for comparing the torque specification applied to the assembled fastener joint with a desired set point within the acceptable torque specification range to calculate a torque difference therebetween, and means for adjusting the torque specification of a fastener joint to be assembled based upon a correction factor applied to the difference from said assembled fastener joint to obtain a torque specification for the next fastener joint assembled by said air tool upon re-energizing and opening said solenoid and valve member, respectively, and de-activating and activating said throttle valve, at a torque specification closer to the desired set point torque specification.

2. A method for controlling the torque shut off point of an air tool comprising the steps of:

assembling a fastener joint to a preprogrammed torque specification within a range of acceptable preprogrammed torque specifications using an air tool having a solenoid valve assembly wherein, said solenoid valve assembly includes a solenoid, a valve member and a throttle valve, which during operation of said air tool and solenoid, valve member and throttle valve are energized, open and activated, respectively, to permit the flow of line pressure air for assembling said fastener joint, and said solenoid and valve member, upon completion of assembly of said fastener joint, are de-energized and closed, respectively, to prevent the flow of line pressure air operating said tool, measuring the torque specification of the assembled fastener joint, comparing the measured torque specification with a desired set point torque specification within the range of acceptable torque specifications, calculating a torque correction factor based upon the difference between the measured torque specification and the desired set point torque specification, adjusting the shut off point of the air tool to obtain a subsequent fastener joint having a torque specification nearer the desired set point torque specification, providing said solenoid valve assembly with line pressure air to shut off the air tool at the adjusted shut off point, and utilizing line pressure air and said throttle valve to maintain said solenoid valve assembly and air tool in a non-operating condition prior to de-activation of said throttle valve in preparation for assembly of a subsequent fastener point.

3. An air tool torque control system comprising an air tool for assembling fastener joints to a desired torque specification, a controller having a torque select device for selecting a preprogrammed desired torque specification for assembly of a specified fastener joint, and a preprogrammed torque shut off point for shutting off said air tool upon assembly of a fastener to the desired torque specification, and said controller having means to control said air tool by continuous programmed adjustment of said torque shut off point by measuring a torque specification of each fastener torque specification range with said measured torque specification of said assembled fastener joints, and adjusting the preprogrammed torque shut off point of said tool within said controller using a calculated correction factor determined in part by a percent difference obtained from the comparison of acceptable and measured torque specifications.

4. The air tool torque control system of claim 3, wherein said air tool includes a fast acting solenoid valve assembly utilizing line pressure air to close said valve assembly, and thereby improve torque shut off control and the effectiveness of the control system.

5. The air tool torque control system of claim 4, wherein said fast acting solenoid valve assembly of said air tool includes a throttle valve and valve member, in part utilizing line pressure air, to maintain said valve assembly and air tool in a non-operating condition prior to preparation for assembly of a subsequent fastener joint.

6. The air tool torque control system of claim 5, said system including a second air tool for assembling fastener joints to a second desired torque specification, and a second torque select device with said torque select device and second torque select device each having a four position selector, and said controller includes a second preprogrammed torque shut off point for shutting off said second air tool upon assembly of a fastener to the second desired torque specification, and said controller is operative to control said air tool and second air tool by continuous programmed adjustment of each of said torque shut off points.

* * * * *